United States Patent [19]

Kozakevich

[11] Patent Number: 5,056,698
[45] Date of Patent: Oct. 15, 1991

[54] ELECTRIC CORD HOLDER FOR AUTOMOTIVE VEHICLE

[76] Inventor: Bernie Kozakevich, Box 233 Redwater, Alberta, Canada, T0A 2W0

[21] Appl. No.: 615,375

[22] Filed: Nov. 19, 1990

[30] Foreign Application Priority Data

May 18, 1990 [CA] Canada .................................. 2020120

[51] Int. Cl.$^5$ .............................................. B60R 11/00
[52] U.S. Cl. ................................. 224/273; 242/85.1; 242/96; 191/12.2 R; 248/52
[58] Field of Search ................ 224/42.03 R, 42.03 A, 224/273; 40/200, 209, 210; 211/26; 248/51, 52; 242/85.1, 96; 191/42.2 R

[56] References Cited

U.S. PATENT DOCUMENTS

| | | | | |
|---|---|---|---|---|
| 3,689,868 | 9/1972 | Snyder | ............................ | 252/85.1 X |
| 4,061,290 | 12/1977 | Hassell | ................................. | 242/96 |
| 4,585,194 | 4/1986 | Schwob | ................................. | 248/52 |
| 4,778,125 | 10/1988 | Hu | ........................................ | 242/85.1 |
| 4,872,622 | 10/1989 | Mansfield | ........................... | 242/85.1 |

FOREIGN PATENT DOCUMENTS 0658833  12/1986  Switzerland ........................ 224/273

Primary Examiner—Henry J. Recla
Assistant Examiner—Glenn T. Barrett
Attorney, Agent, or Firm—George Haining Dunsmuir

[57] ABSTRACT

A relatively simple carrier for an electrical extension cord and a license plate includes a rectangular casing with an open front end, a spool slidably mounted in the open front end of the casing for movement between a closed position in which the spool is located in and closes the casing, and an open position in which the spool is accessible outside of the casing, permitting the winding of the extension cord onto the spool. Spring and cam devices positively bias has the spool to the closed or open position when the spool is moved to such position.

5 Claims, 4 Drawing Sheets

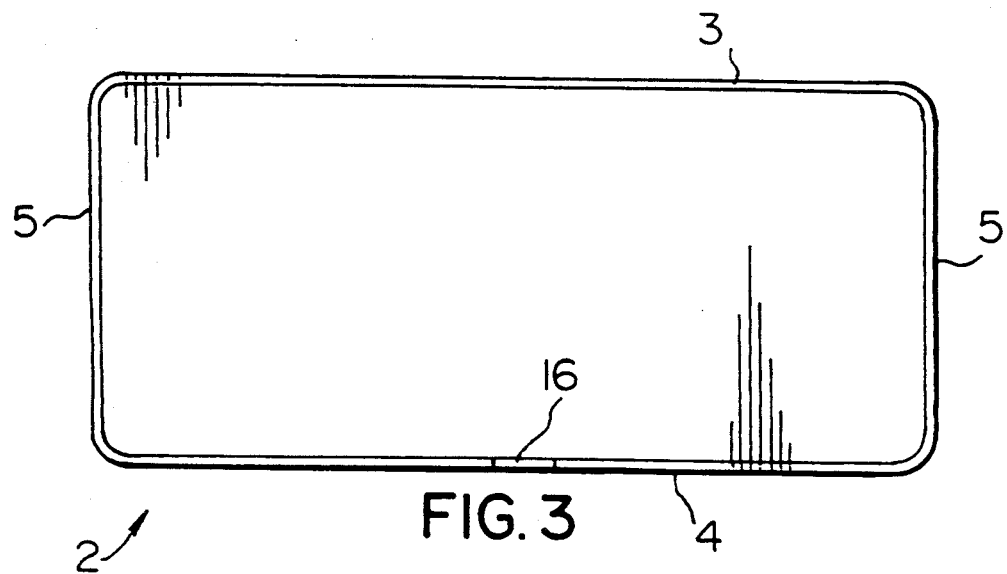
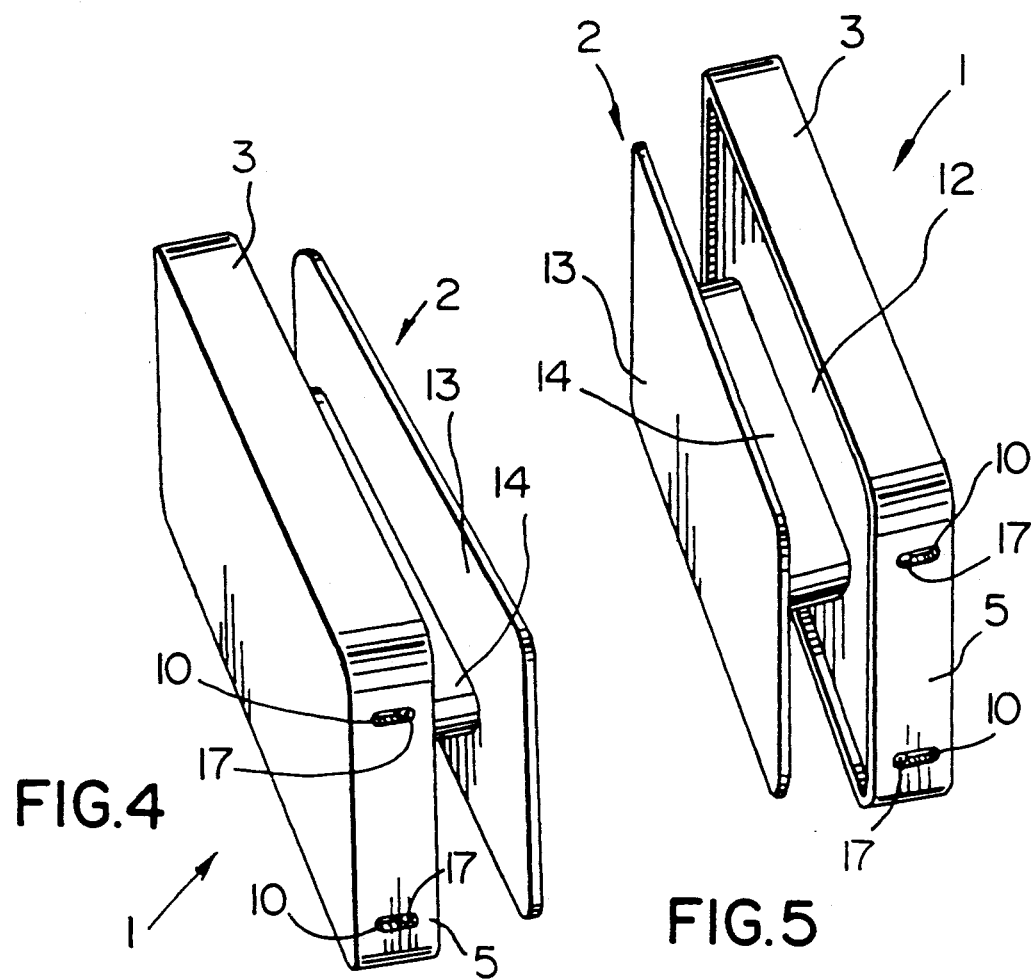

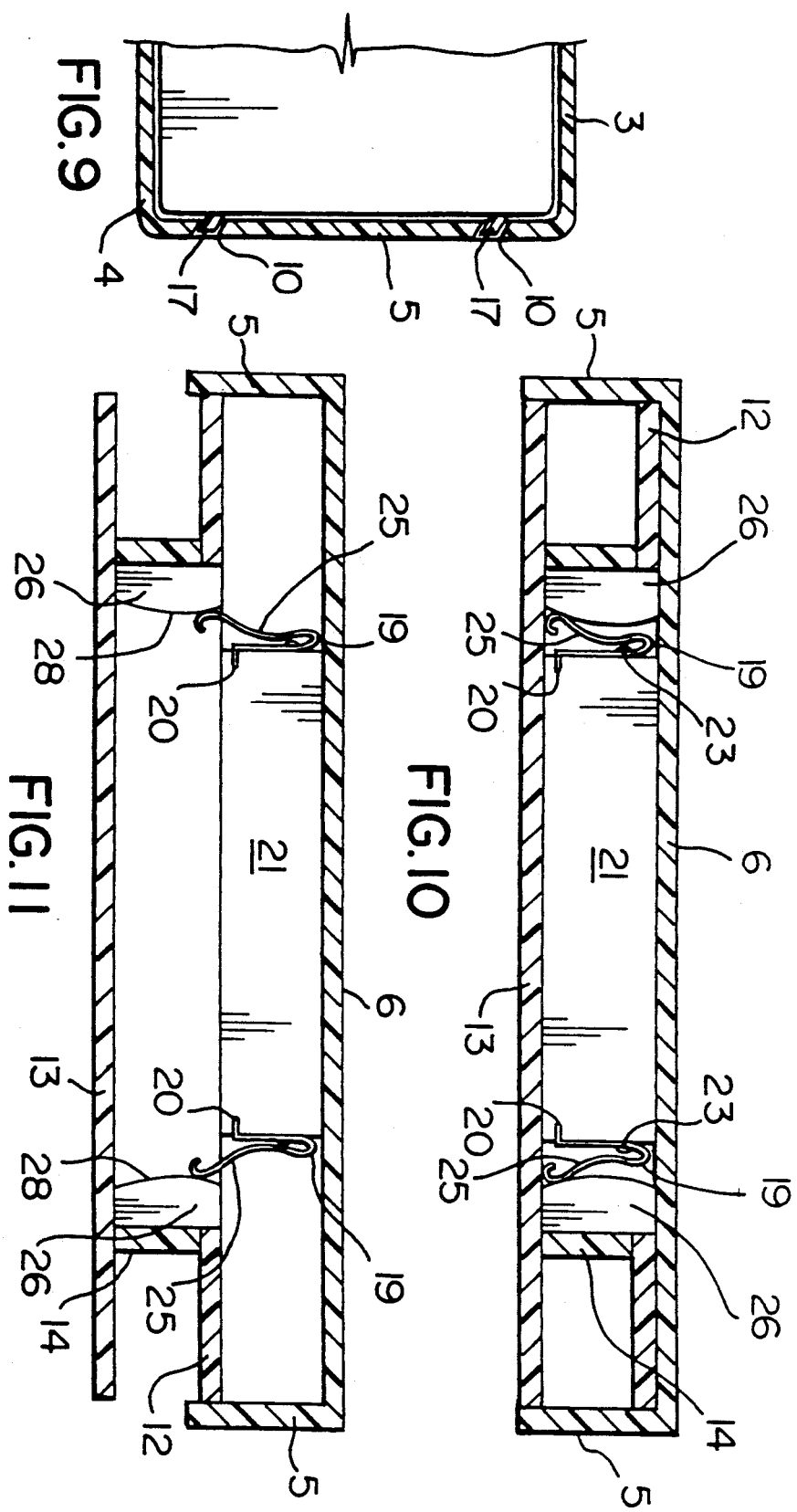

ELECTRIC CORD HOLDER FOR AUTOMOTIVE VEHICLE

BACKGROUND OF THE INVENTION

This invention relates to an extension cord for use on an automotive vehicle.

It is common practice in cold climes to install a block heater in the engine of an automobile. An electrical cord or cable is connected to the heater and extends from the heater to the grill or front bumper of the vehicle. In order to connect the heater to a source of electrical power, typically an exterior wall outlet, an extension cord is extended between the source of power and a plug on the outer free end of the heater cable. When not in use, the cable is often left outside where it can be lost in a snowdrift or stolen.

The object of the present invention is to solve the above-identified problem by providing a relatively simple carry for an electrical extension cord which can readily be mounted on a vehicle, and which can also be used to carry a license plate.

BRIEF SUMMARY OF THE INVENTION

Accordingly, the present invention relates to an electrical cord and license plate carrier for use on an automotive vehicle comprising rectangular casing means, said casing means including side walls, top and bottom walls and one end wall; spool means slidable in the open end of said casing means, at least one of said casing means and said spool means being adapted to carry a license plate; and stop means for limiting movement of said spool means between a closed position in which said spool means is located in and closes said open end of the casing means, and an open position in which said spool means is accessible, permitting winding of a cord thereon.

BRIEF DESCRIPTION OF THE DRAWINGS

The invention will be described in greater detail with reference to the accompanying drawings, which illustrate a preferred embodiment of the invention, and wherein:

FIG. 3 is a rear view of the carrier of FIG. 1;

FIG. 4 is an isometric view from above and the front of the carrier of FIGS. 1 to 3 in the open position;

FIG. 5 is an isometric view from above and the rear of the carrier of FIG. 4;

FIG. 9 is a longitudinally sectional view of one end of the casing of the carrier of FIG. 1; and FIGS. 10 and 11 are cross sections taken generally along line X—X of FIG. 2 showing the carrier in the closed and opening positions, respectively.

DESCRIPTION OF THE PREFERRED EMBODIMENT(S)

Figure 2:
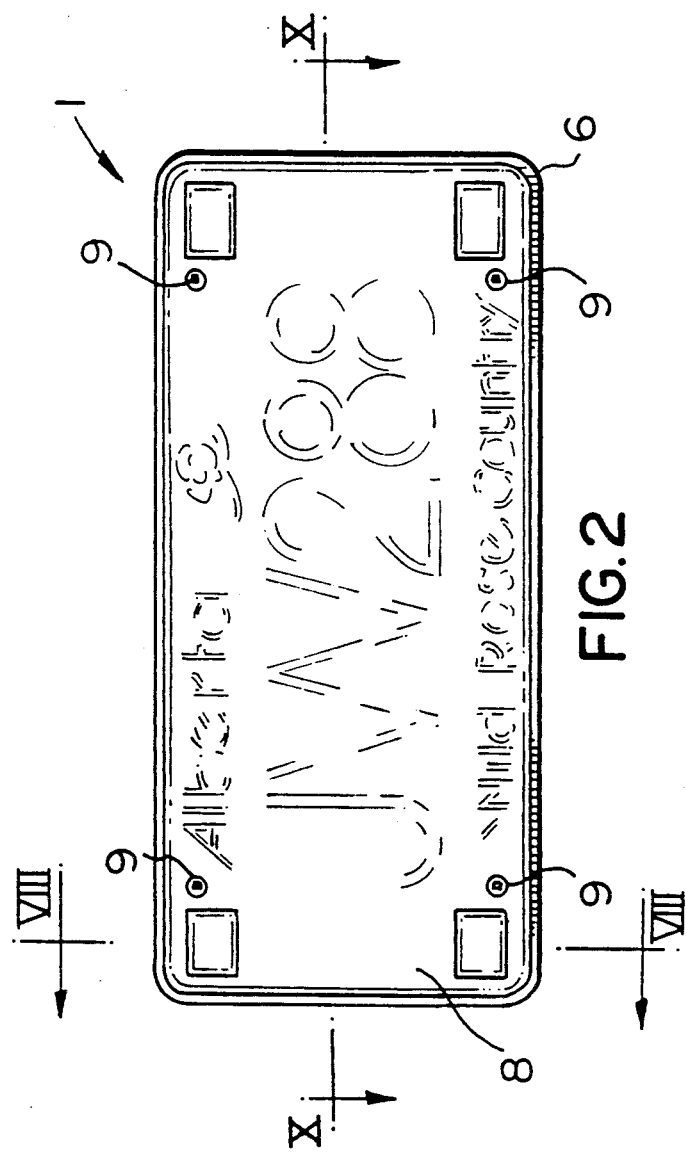
FIG. 2 is a front view of the carrier of FIG. 1.
Figure 1:
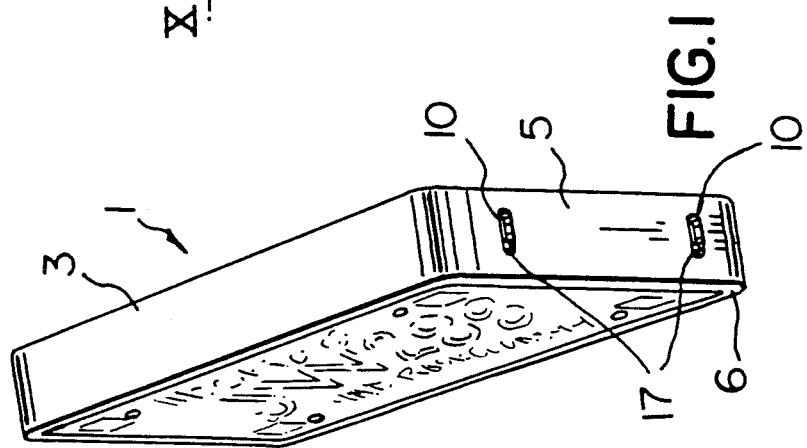
FIG. 1 is an isometric view from above and one side of a carrier in accordance with the present invention in the closed position.
Figure 6:
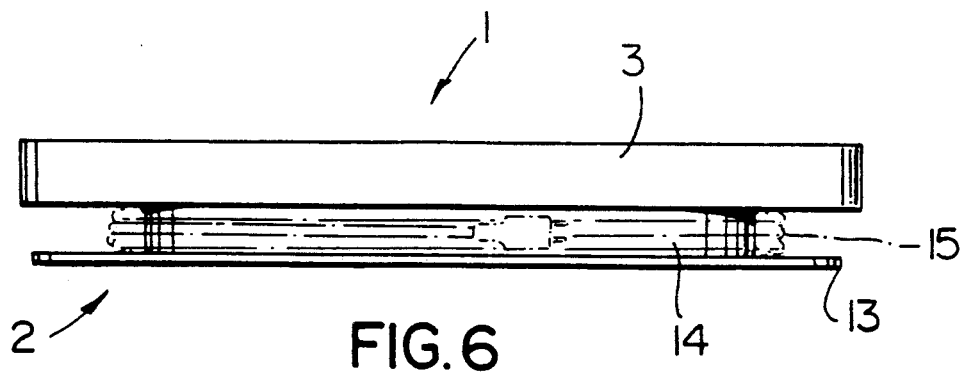
FIG. 6 is a plan view of the open carrier of FIG. 4.
Figure 7:
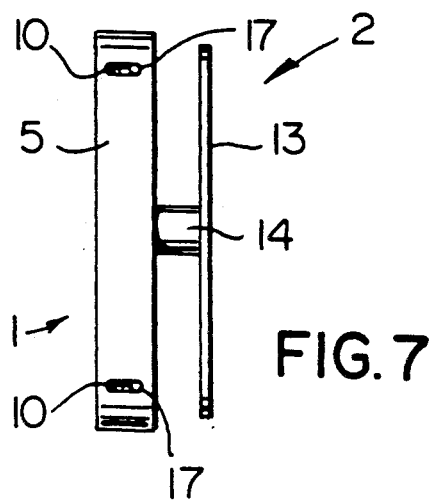
FIG. 7 is a side view of the open carrier of FIG. 4.
Figure 8:
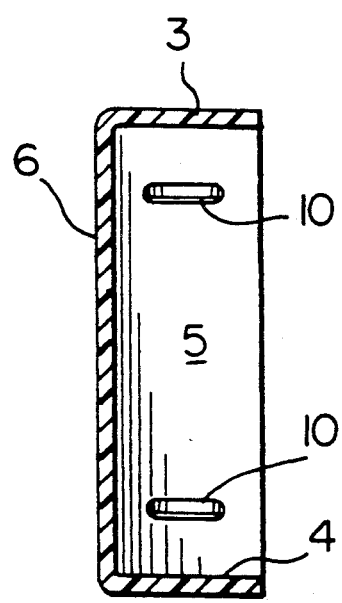
FIG. 8 is a cross section of the casing of the carrier of FIG. 1 taken generally along line VIII—VIII of FIG. 2.

Referring to FIGS. 1 to 7, the carrier of the present invention includes a casing and a spool generally indicated at 1 and 2, respectively, the casing 1 is defined by a top wall 3, a bottom wall 4, side walls 5 and an end wall 6. Thus, the casing 1 is in the form of a container with one open end for receiving the spool 2. A license plate 8 (FIGS. 1 and 2) is mounted on the end wall 6 of the casing 1 using screws 9. A pair of horizontal, outwardly and downwardly inclined slots 10 is provided in each side wall 5 of the casing 1 for limiting sliding movement of the spool 2 in the casing, as described hereinafter in greater detail.

As best known in FIGS. 4 to 7, the spool 2 includes inner and outer walls 12 and 13. The tube 14 receives an electrical extension cord 15 (FIG. 6), which is wound on the tube when not in use. One end (not shown) of the cord 15 is connected to the block heater of the vehicle, and the cord passes upwardly through a hole 16 (FIG. 3) in the centre of the bottom wall 4 of the casing 1 at the open outer end thereof to the tube 14. When not in use, the cord 15 is stored on the tube 14 by winding the cord therearound.

As mentioned above, movement of the spool 2 between the closed or storage position (FIGS. 1 to 3) and the open or cord use position (FIGS. 4 to 7) is limited by slots 10 in the casing 1, which receive downwardly and outwardly inclined pins 17 (FIGS. 4, 5, 7 and 9). The pins 17 extend outwardly from each side of the front or inner panel 12 of the spool 2.

Referring to FIGS. 10 and 11, the spool 2 is biased to both the inner and outer positions by a pair of leaf springs 19. One end 20 of each spring 19 is mounted in a block 21 mounted centrally on the end wall 6 of the casing 1. The spring 19 is retained on the end of the block 21 by screws 23. The spring 19 is bent over on itself, the outer, free arm 25 thereof bearing against a cam block 26. The surface 28 of the block 26 contacted by the spring arm 25 is convex. Thus, at the limits of travel of the spool 2 (as dictated by the slots 10 and the pins 17), the springs 19 press against the blocks 26 to bias the spool to the position it is in, i.e. closed or open. When moving the spool 2 relative to the casing 1, the spring arm 25 is depressed slightly towards the block 21. Thus, the springs 19 releasably hold the spool 2 in the closed or open position.

In use, end panel 13 of the spool 2 is connected to the license plate bracket (not shown) on an automotive vehicle. The extension cord is passed through the hole 16 in the casing 1 and connected to the block heater. The plug end of the cord is wound on the tube 14 of the spool 2. Alternatively, with a large enough hole 16, the female plug of an extension cord, is connected to an existing male plug on the end of a cable from the block heater, and the extension cord 15 is fed through the hole 16 and wound on the spool tube 14.

What I claim is:

1. An electrical cord and license plate carrier for use on an automotive vehicle comprising rectangular casing means, said casing means including side walls, top and bottom walls and one wall; spool means slidable in an open end of said casing means, at least one of the said casing means and said spool means being adapted to carry a license plate; and stop means for limiting movement of said spool means between a closed position in which said spool means is located in and closes said open end of the casing means, and an open position in which said spool means is accessible, permitting winding of a cord thereon.

2. A carrier according to claim 1, wherein said stop means includes slot means in said casing means, and lug means extending outwardly from said spool means for sliding in said slot means, ends of said slot means limiting movement of said spool means relative to the casing means.

3. A carrier according to claim 1, including spring means between said casing means and said spool means releasably latching said spool means in the closed and open positions.

4. A carrier according to claim 3, wherein said spool means includes inner and outer panels slidable in the open end of said casing means; and a tube extending between said inner and outer panels said tube containing said spring means when the spool means is in the closed position.

5. A carrier according to claim 4, including a block means extending outwardly from the end wall of said casing means towards the open end thereof, said block means carrying said spring means; and cam means on an interior of said tube for sliding engagement by said spring means.

* * * * *